(12) United States Patent
Otsuji et al.

(10) Patent No.: US 9,371,104 B2
(45) Date of Patent: Jun. 21, 2016

(54) HEADLIGHT DEVICE FOR MOTORCYCLE

(71) Applicant: HONDA MOTOR CO., LTD., Tokyo (JP)

(72) Inventors: Miku Otsuji, Wako (JP); Hayato Ohashi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 135 days.

(21) Appl. No.: 14/226,490

(22) Filed: Mar. 26, 2014

(65) Prior Publication Data

US 2014/0293628 A1    Oct. 2, 2014

(30) Foreign Application Priority Data

Mar. 29, 2013 (JP) ................. 2013-075376

(51) Int. Cl.
*B62J 6/02* (2006.01)
*F21S 8/10* (2006.01)
*F21V 29/00* (2015.01)
*F21V 29/83* (2015.01)

(52) U.S. Cl.
CPC ............. B62J 6/02 (2013.01); F21S 48/1159 (2013.01); F21S 48/137 (2013.01); F21S 48/2237 (2013.01); F21S 48/328 (2013.01); F21V 29/83 (2015.01); *F21S 48/215* (2013.01); *F21S 48/2268* (2013.01); *F21S 48/325* (2013.01)

(58) Field of Classification Search
CPC ....... B62J 6/02; F21S 48/1159; F21S 48/137; F21S 48/2237; F21S 48/215; F21S 48/2268; F21S 48/323; F21S 48/325; F21S 48/328; F21V 29/504; F21V 29/505; F21V 29/507; F21V 29/83

USPC .............................................. 362/96, 294, 373
See application file for complete search history.

(56) References Cited

U.S. PATENT DOCUMENTS

| 4,796,163 A * | 1/1989 | Dressler ................ F21S 48/335 362/294 |
| 4,931,912 A * | 6/1990 | Kawakami ............ F21S 48/335 362/294 |
| 6,439,753 B1 | 8/2002 | Sumada et al. |
| 6,497,507 B1 * | 12/2002 | Weber ................... F21S 48/335 362/218 |
| 6,951,417 B2 * | 10/2005 | Ito .............................. B62J 6/02 362/373 |

(Continued)

FOREIGN PATENT DOCUMENTS

| JP | 2011-65839 A | 3/2011 |
| JP | 2012-195261 A | 10/2012 |

(Continued)

OTHER PUBLICATIONS

Office Action issued in co-pending U.S. Appl. No. 14/225,568 on Nov. 2, 2015.

(Continued)

*Primary Examiner* — Alan Cariaso
(74) *Attorney, Agent, or Firm* — Birch, Stewart, Kolasch & Birch, LLP

(57) ABSTRACT

A headlight device for a motorcycle that can enhance cooling efficiency inexpensively, without using any special device. In the headlight device for the motorcycle, reflectors are provided with inlet parts through which cooling air is taken into an inside space. In addition, a louver provided on the upper sides of the reflectors is provided, at a position close to an outer lens, with openings through which the air in the inside space is discharged into an inside space.

16 Claims, 14 Drawing Sheets

(56) References Cited

U.S. PATENT DOCUMENTS

| | | | |
|---|---|---|---|
| 7,329,033 B2 * | 2/2008 | Glovatsky | B60Q 1/0052 362/294 |
| 7,427,152 B2 * | 9/2008 | Erion | F21S 48/1159 362/373 |
| 7,625,110 B2 * | 12/2009 | Kracker | B60Q 1/0017 362/294 |
| 2007/0058381 A1 | 3/2007 | Domoto et al. | |
| 2008/0225535 A1 | 9/2008 | Mochizuki | |
| 2008/0239737 A1 | 10/2008 | Aoki | |
| 2009/0040779 A1 | 2/2009 | Ohzono | |
| 2011/0063863 A1 | 3/2011 | Hotei et al. | |
| 2011/0149587 A1 | 6/2011 | Hayashi et al. | |
| 2011/0273899 A1 | 11/2011 | Ota et al. | |
| 2011/0280028 A1 | 11/2011 | Uchida | |
| 2012/0140501 A1 | 6/2012 | Nakazato et al. | |
| 2012/0236583 A1 | 9/2012 | Ochiai et al. | |
| 2013/0063966 A1 | 3/2013 | Sumi et al. | |
| 2014/0056016 A1 | 2/2014 | Marcori et al. | |
| 2014/0071705 A1 | 3/2014 | Kouchi | |

FOREIGN PATENT DOCUMENTS

| | | | |
|---|---|---|---|
| WO | WO 2009/110080 A1 | 9/2009 | |
| WO | WO 2012070169 A1 * | 5/2012 | B62J 6/02 |

OTHER PUBLICATIONS

Office Action issued in co-pending U.S. Appl. No. 14/226,547 on Oct. 7, 2015.

* cited by examiner

HEADLIGHT DEVICE FOR MOTORCYCLE

CROSS-REFERENCE TO RELATED APPLICATIONS

The present application claims priority under 35 USC 119 to Japanese Patent Application No. 2013-075376 filed Mar. 29, 2013 the entire contents of which are hereby incorporated by reference.

BACKGROUND OF THE INVENTION

1. Field of the Invention

The present invention relates to a headlight device for a motorcycle, for reflecting light from a light source by a reflector and transmitting the reflected light through a lens to radiate the light forward.

2. Description of Background Art Japanese Patent Laid-Open No. 2012-195261 discloses a headlight device for a motorcycle, for reflecting light from a headlight (serving as a light source) by a reflector and transmitting the reflected light through a lens to radiate light forward, wherein cooling air flows inside the headlight device to thereby cool the light source.

In the above-mentioned configuration, the outside air entering through intake holes of the headlight device passes through an inlet part formed at the reflector in a position under the light source, and enters as cooling air into an inside space formed by the lens and the reflector. This ensures that the cooling air cools the light source disposed in a central portion of the inside space. Thereafter, the cooling air passes through an outlet part formed on the upper side of the light source, and is discharged via exhaust holes to the exterior.

Thus, the cooling air passes through a roughly central area in the headlight device to cool the light source. Therefore, cooling air that is somewhat warmed passes through the area ranging from the light source to the exhaust holes. In this connection, an improvement of cooling efficiency is being desired. To improve the cooling efficiency, a special device or the like is needed, which may lead to an increase in the manufacturing cost of the headlight device.

SUMMARY AND OBJECTS OF THE INVENTION

In view of this, it is an object of an embodiment of the present invention to provide a headlight device for a motorcycle that can enhance cooling efficiency inexpensively, without using any special device.

A headlight device (10) for a motorcycle (12) according to an embodiment of the present invention is a device adapted to reflect a light beam (170L, 170R) from a light source (162L, 162R) by a reflector (152L, 152R) and transmit the reflected light beam (170L, 170R) through a lens (102) to radiate a light beam forward. The headlight device (10) has the following characteristics.

The headlight device (10) includes an inlet part (222L, 222R) through which cooling air is taken in. The inlet part (222L, 222R) is provided at the reflector (152L, 152R). An outlet part (122L, 122R) is provided through which the cooling air is discharged. The outlet part (122L, 122R) is provided at a position on the upper side of the inlet part (222L, 222R) of the reflector (152L, 152R) and close to the lens (102).

A plurality of the outlet parts (122L, 122R) are provided along the lateral direction of the motorcycle (12).

In addition, the light source (162L, 162R) is an LED light source, and the headlight device (10) further includes cooling means (166L, 166R) for cooling the LED light source (162L, 162R). The cooling means (166L, 166R) is disposed rearwardly of the reflector (152L, 152R).

Further, the reflector (152L, 152R) is provided, at an upper surface (154L, 154R) thereof, with a first gap (224L, 224R) at a position close to the lens (102) on the front side and with a second gap (226L, 226R) rearwardly of the first gap (224L, 224R). In this case, the second gap (226L, 226R) is narrower than the first gap (224L, 224R).

According to an embodiment of the present invention, the outlet part is provided on the upper side of the inlet part of the reflector, close to the lens on the front side. This ensures that the cooling air taken into the inside space of the headlight device by passing through the inlet part flows along the inner surface of the lens to the outlet part. As a result, the cooling air can be cooled by the airflow (generated by movement of the vehicle) making contact with the outer surface of the lens. Therefore, the cooling efficiency can be enhanced inexpensively, without using any special device.

According to an embodiment of the present invention, the plurality of outlet parts are provided along the lateral direction. Therefore, a sufficient passage area concerning the outlet parts can be secured, whereby the flow of the cooling air can be made more efficient. This enables a further enhancement of the cooling efficiency concerning the headlight device. In addition, when the reflector and the outlet parts are externally viewed through the lens, the outlet parts are visually recognized as being visible on a large scale on the upper side of the reflector. As a result, the external appearance quality of the headlight device can also be enhanced.

According to an embodiment of the present invention, the cooling means is disposed rearwardly of the reflector, whereby the cooling means can be made hardly visible externally. In addition, the arrangement of the cooling means rearwardly of the reflector enables the cooling air discharged via, the outlet parts to be cooled by the cooling means. As a result, the cooling efficiency can be further enhanced.

According to an embodiment of the present invention, the second gap is narrower than the first gap, which ensures that the cooling air taken in via the inlet part is liable to flow to and through the first gap. As a result, a cooling effect owing to the airflow (generated by movement of the vehicle) can be increased and reliably expected. Thus, a further cooling effect concerning the headlight device as a whole can be expected.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

A headlight device for a motorcycle according to the present invention will be described in detail below, by showing a preferred embodiment and while referring to the accompanying drawings.

Figure 1:
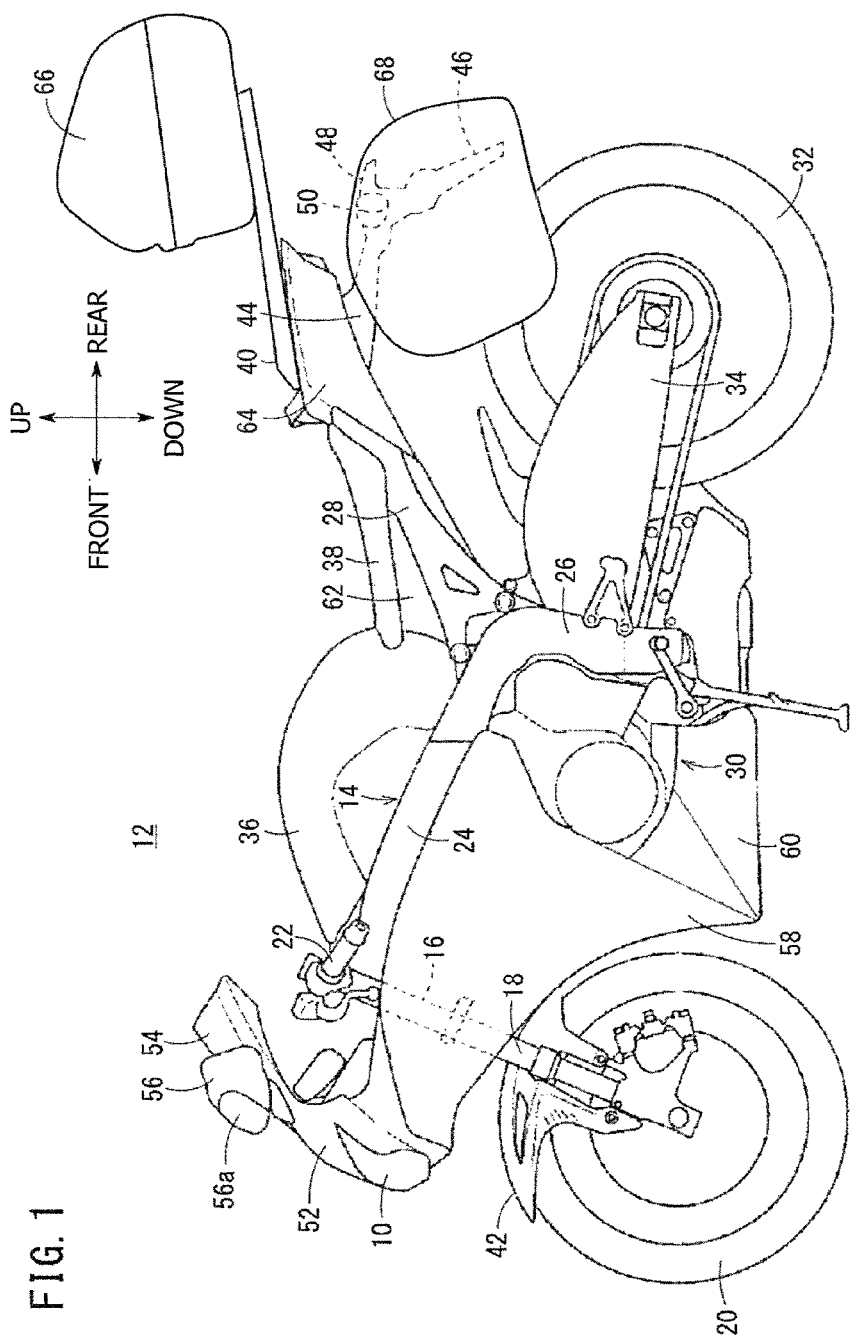
FIG. 1 is a left side view of a motorcycle having mounted thereon a headlight device according to an embodiment of the present invention.
Figure 2:
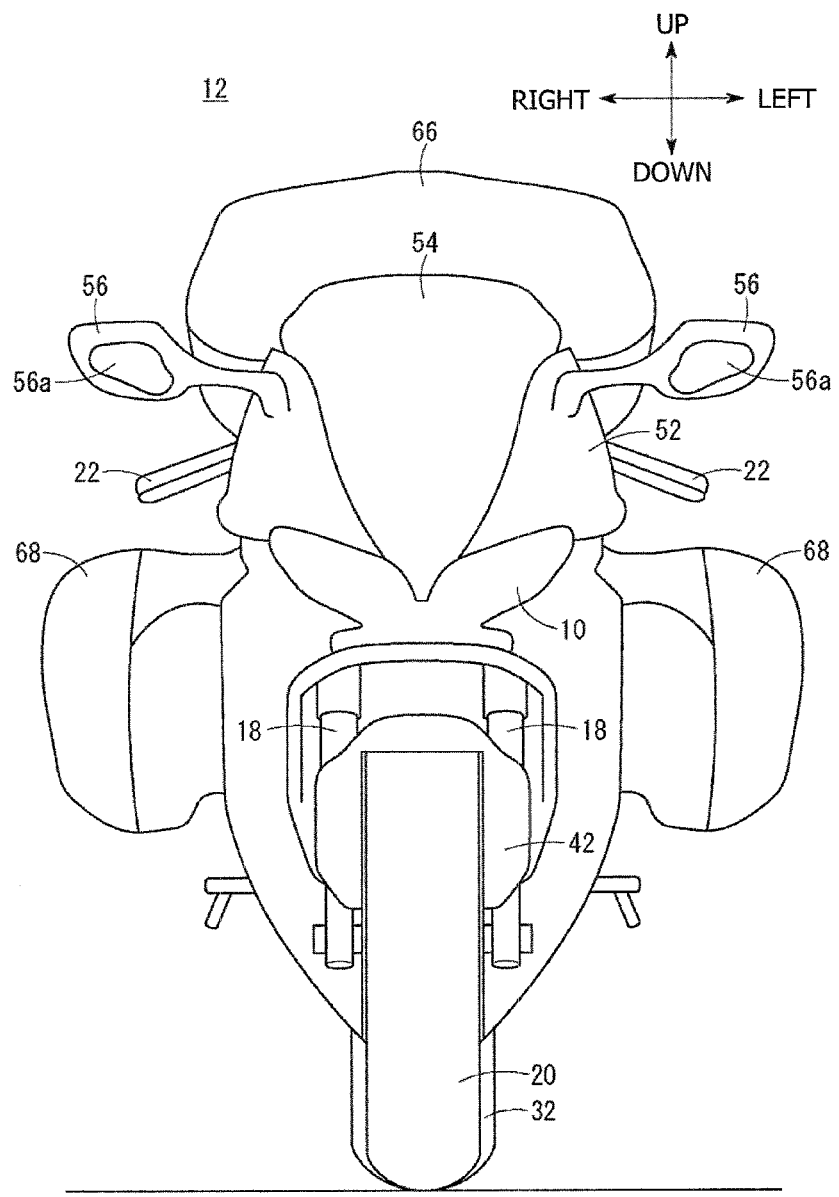
FIG. 2 is a front view of the motorcycle of FIG. 1.

FIG. 1 is a left side view of a motorcycle 12 having mounted thereon a headlight device 10 according to this embodiment, and FIG. 2 is a front view of the motorcycle 12. Reference to the front, rear, up, down, left and right directions will be described in accordance with the directions of the arrows shown in FIGS. 1 and 2, unless specified otherwise.

The motorcycle 12 has a body frame 14 with a head pipe 16 being provided at a front end portion of the body frame 14. A pair of left and right front forks 18 are rotatably supported on the head pipe 16. The pair of left and right front forks 18 rotatably support a front wheel 20, which is a steering wheel. A bar-shaped steerable handle 22 is mounted to upper portions of the pair of left and right front forks 18.

In addition, the body frame 14 further includes a pair of left and right main frames 24 extending rearwardly from the head pipe 16 with a pair of left and right pivot plates 26 provided on the rear side of the pair of left and right main frames 24 and a pair of left and right seat frames 28 provided on the pair of left and right pivot plates 26 and obliquely extending rearwardly and upwardly. On the pair of left and right main frames 24, a power unit 30 is provided which includes an engine and a transmission. A swing arm 34 rotatably supporting a rear wheel 32 as a driving wheel is swingably supported by the pivot plates 26.

On the upper side of the pair of left and right main frames 24, a fuel tank 36 is provided. Rearwardly of the fuel tank 36 and on the upper side of the left and right seat frames 28, a driver's seat 38 is provided on which to seat the driver. A pillion seat 40 on which to seat a pillion passenger is provided rearwardly of the driver's seat 38.

A front fender 42 is provided on the pair of left and right front forks 18. A rear fender 44 is provided at rear portions of the pair of left and right seat frames 28. A license plate 46, a license light 48 illuminating the license plate 46, and rear blinkers 50 are attached to the rear fender 44.

In addition, an upper cowl 52 for protection on the front side is provided on the body frame 14. In this case, the headlight device 10 according to the present embodiment, as a lighting apparatus for lighting the front side, is provided at a front portion of the front cowl 52. A windscreen 54 is provided on the upper side of the upper cowl 52. Rearview mirrors 56 for the driver to check the rear side therewith are provided at upper portions of the upper cowl 52. Front blinkers 56a are incorporated in the rearview mirrors 56.

Furthermore, the motorcycle 12 is provided with a middle cowl 58 for covering side parts on the front side. An undercover 60 is provided rearwardly of the middle cowl 58 and on the lower side in the motorcycle 12. Side covers 62 for covering the areas ranging from upper portions of the seat frames 28 to a lower portion of the driver's seat 38 are provided on the upper side of the seat frames 28. A rear cover 64 is provided rearwardly of the seat frames 28.

In addition, a trunk box 66 is mounted rearwardly of the pillion seat 40. A pair of left and right saddle bags 68 are mounted to the rear cover 64.

Hereafter, the headlight device 10 according to this embodiment will be described below referring to FIGS. 3 to 14.

Figure 3:
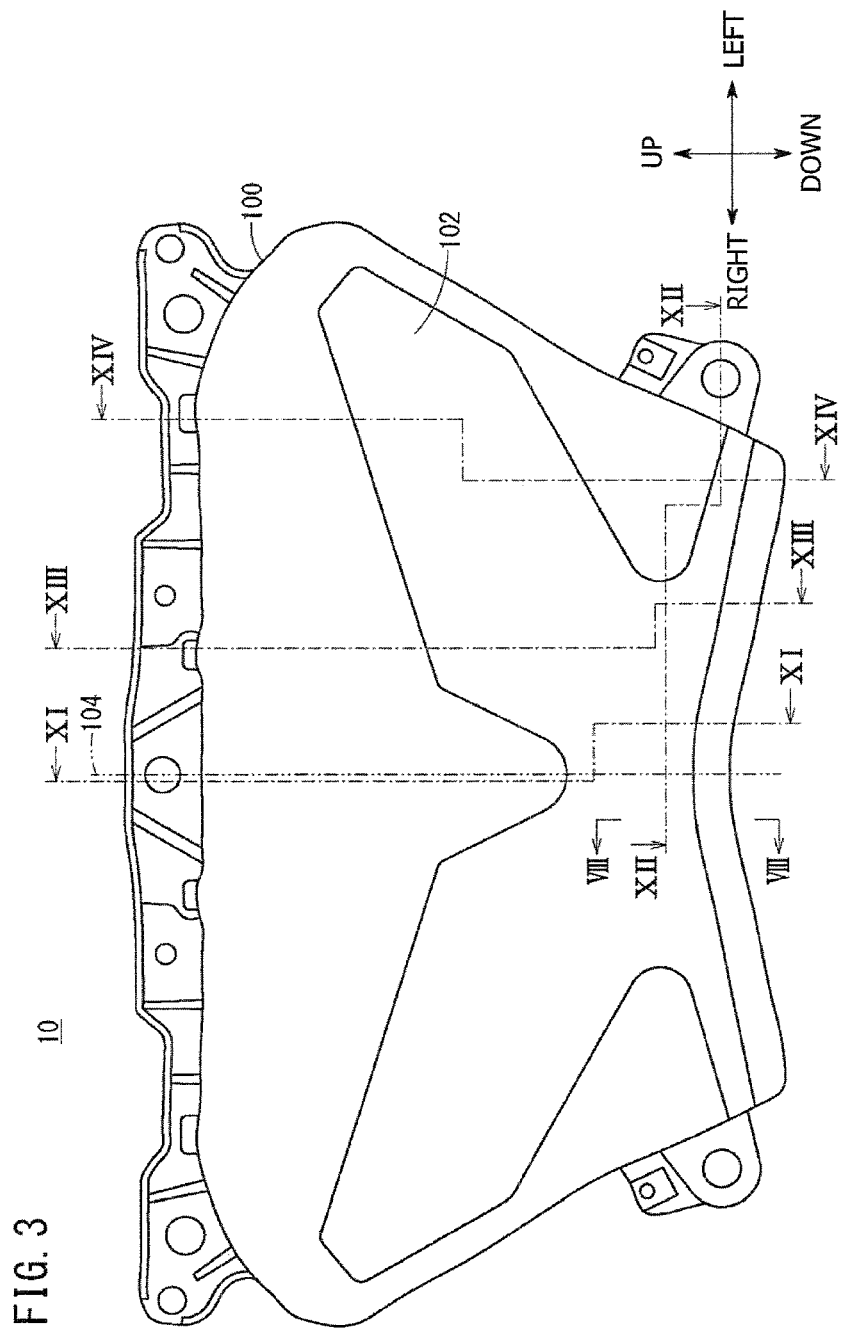
FIG. 3 is a front view of the headlight device of FIG. 1.

FIG. 3 is a front view of the headlight device 10 provided as a headlamp (lighting apparatus).

The headlight device 10 includes a housing 100, and an outer lens 102 (lens) which is provided forwardly of the housing 100 and which allows transmission of light therethrough. In this case, the headlight device 10 basically has a structure in left-right symmetry about a vertically extending center line 104 of the motorcycle 12 (see FIGS. 1 and 2) inclusive of the headlight device 10. Therefore, the outer lens 102 is formed in an X shape which is in left-right symmetry about the center axis 104 in the front view. In the X shape, upper-side portions are in the shape of eyes that are turned up at the corners, whereas lower-side portions extend obliquely downwardly. In addition, a part of the outer lens 102 is covered with the upper cowl 52 (see FIGS. 1 and 2). Further, a sealing treatment with a hot melt adhesive 105 (see FIGS. 11 to 14) is applied to the part between an edge portion of the outer lens 102 and an edge portion of the housing 100.

Figure 4:
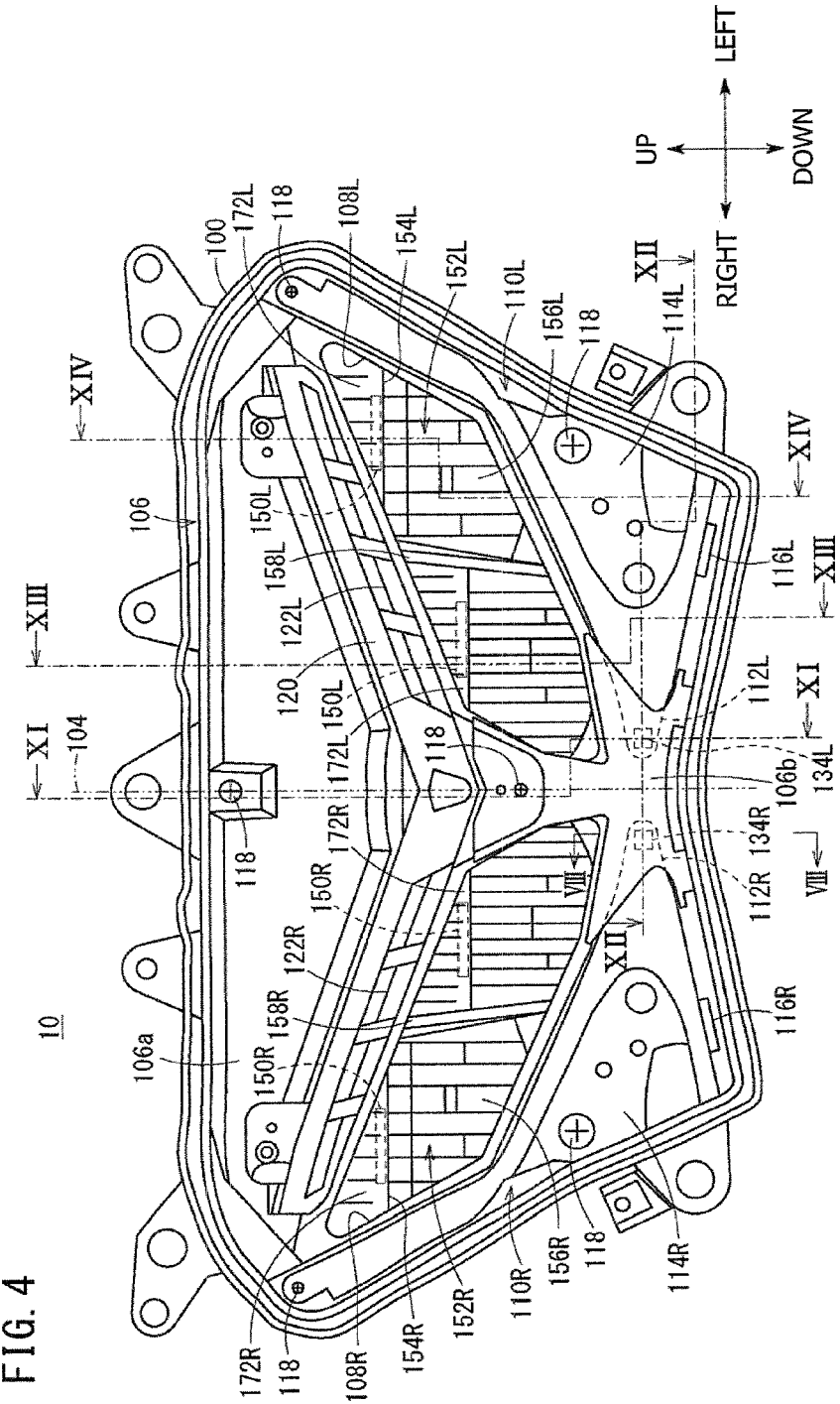
FIG. 4 is a front view showing a state wherein an outer lens has been detached, in the headlight device of FIG. 3.

FIG. 4 is a front view showing a state wherein the outer lens 102 has been detached from the headlight device 10 of FIG. 3.

An extension cover 106 is mounted forwardly of the housing 100, for a design-basis purpose of enhancing the visibility of the headlight device 10. The extension cover 106 is composed of a first extension 106a (extension member) attached to the housing 100 so as to cover the front side of the housing 100 and a second extension 106b (another extension member) attached to a central portion extending along the center line 104 on the front side of the first extension 106a.

The first extension 106a is formed with a pair of openings 108L and 108R in left-right symmetry with the center line 104 as a center. In correspondence with the upper-side portions of the shape of eyes that are turned up at the corners, of the outer lens 102, the openings 108L and 108R are shaped so as to extend obliquely outwardly in a direction laterally from the center line 104. Thus, the pair of left and right openings 108L and 108R are formed in the shape of eyes that are turned up at the corners, with the center line 104 as a center, in a front view. Accordingly, the second extension 106b attached to a central portion of the first extension 106a is formed roughly in the shape of inverted T.

In addition, in the following description, of the component elements of the headlight device 10, those which are arranged in left-right pair with the center line 104 as a center will sometimes be suffixed with a capital "L" indicative of an arrangement on the left side or with a capital "R" indicative of arrangement on the right side.

Figure 5:
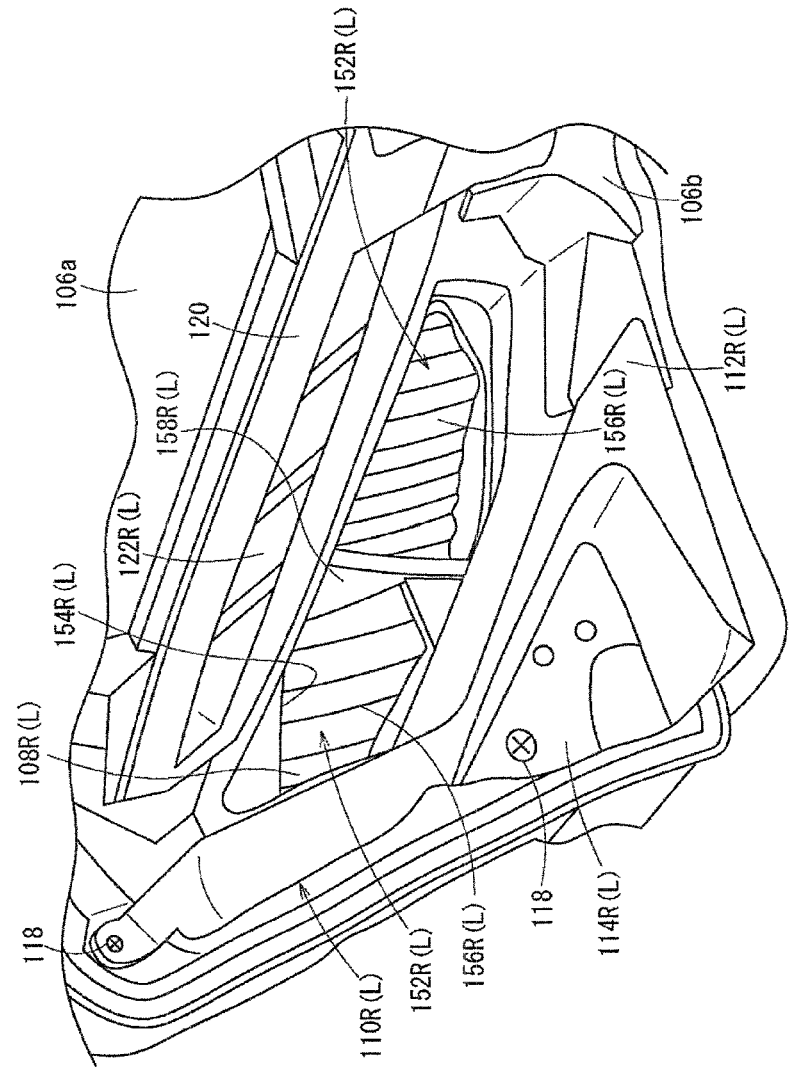
FIG. 5 is a perspective view of a light guide member.
Figure 6:
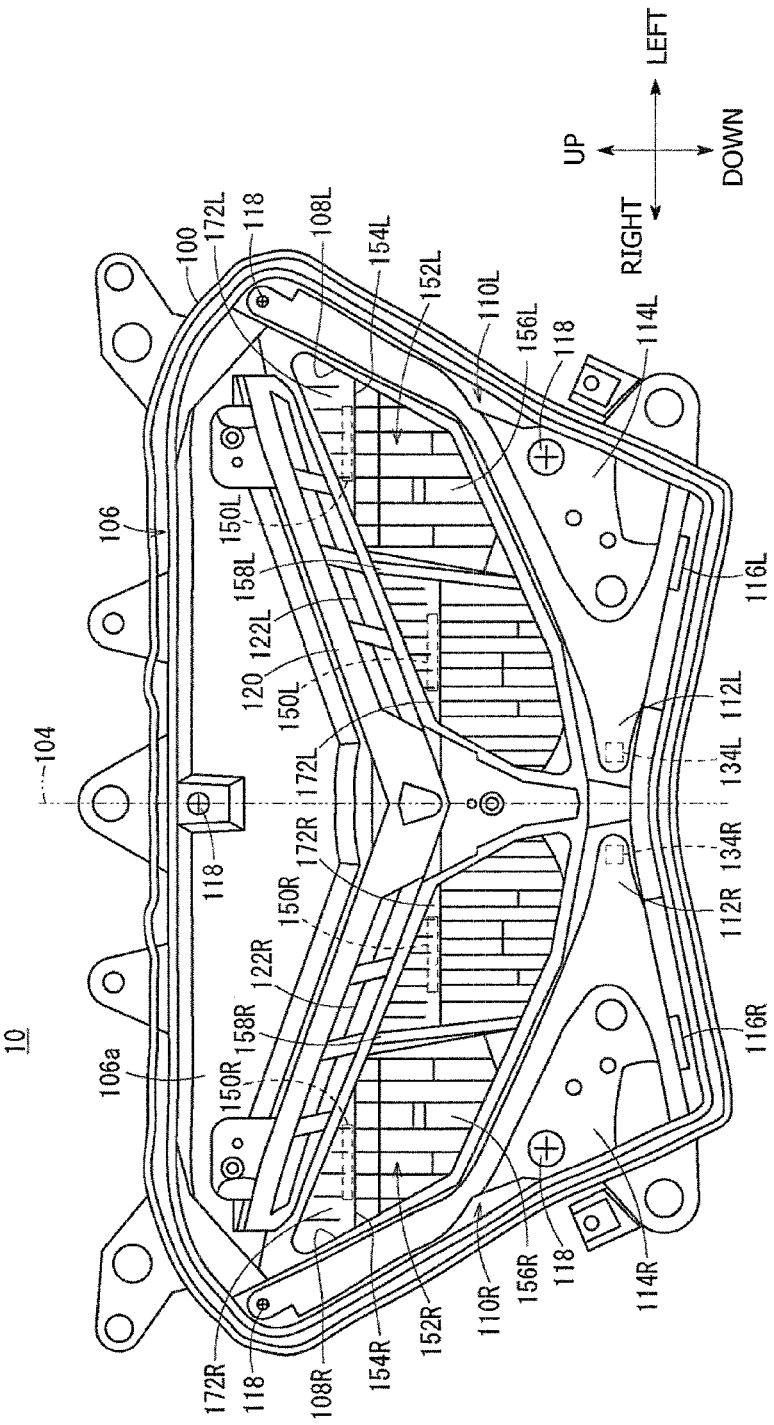
FIG. 6 is a front view showing a state wherein a second extension has been detached, in the headlight device shown in FIG. 4.

Forwardly of the first extension 106a, a pair of light guide members 110L and 110R are mounted in left-right symmetry, in areas ranging from side portions defining the openings 108L and 108R to lower portions. As shown in FIGS. 4 to 6, the light guide members 110L and 110R are shaped so as to extend from obliquely upper sides toward the second extension 106b and to be bent obliquely downwardly in the vicinity of the second extension 106b. Therefore, the pair of left and right light guide members 110L and 110R are attached to the first extension 106a so as to be roughly in the shape of a capital X corresponding to the outer lens 102, with the center line 104 as a center, in front view.

In this case, bent portions 112L and 112R (bent parts) of the light guide members 110L and 110R bent in the vicinity of the second extension 106b extend to positions close to the center line 104, and those parts of the bent portions 112L and 112R which are close to the center line 104 are covered with the second extension 106b on the front side. In addition, the light guide members 110L and 110R are provided also with triangular plate-shaped portions 114L and 114R that are formed to be adjacent to the bent portions 112L and 112R but are spaced from the center line 104.

The first extension 106a is provided at its lower portions with engaging parts 116L and 116R for engagement with a lower portion of the housing 100. Therefore, at the time of attaching the first extension 106a, the second extension 106b and the light guide members 110L and 110R to the housing 100, the attachment can be carried out as follows.

First, a lower portion of the first extension 106a is engaged with a lower portion of the housing 100 by the engaging parts 116L and 116R. Next, the pair of left and right light guide members 110L and 110R are arranged on the first extension 106a so as to be X-shaped in overall shape. Subsequently, the second extension 106b is arranged over the central portion of the first extension 106a so as to cover the bent portions 112L and 112R. Finally, a plurality of screw members 118 (see FIGS. 4 to 6 and FIG. 11) are put into screw engagement with screw holes formed in the housing 100, whereby the first extension 106a, the second extension 106b and the light guide members 110L and 110R are integrally fixed to the housing 100.

On the upper side of the openings 108L and 108R, a roughly V-shaped louver 120 is mounted to a front surface of the first extension 106a so as to project forward. The louver 120 has a left-right symmetrical shape extending obliquely upwardly along the openings 108L and 108R, with the center line 104 as a center. In addition, the louver 120 is formed, along the left-right direction, with a plurality of openings 122L and 122R (outlet parts) opening to the front side (see FIGS. 4, 6, 7, 13 and 14).

Figure 7:
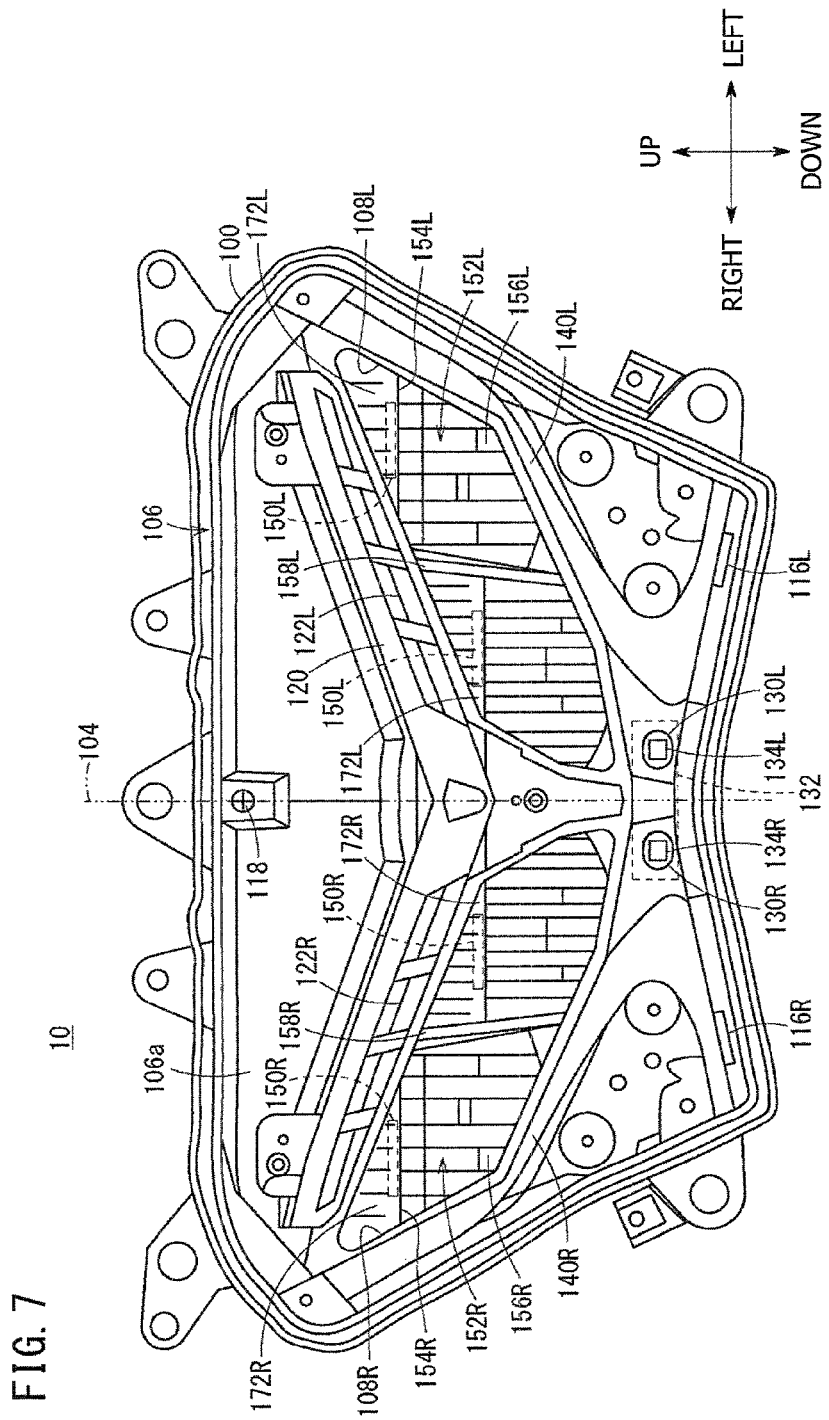
FIG. 7 is a front view showing a state wherein the light guide member has been detached, in the headlight device shown in FIG. 6.
Figure 8:
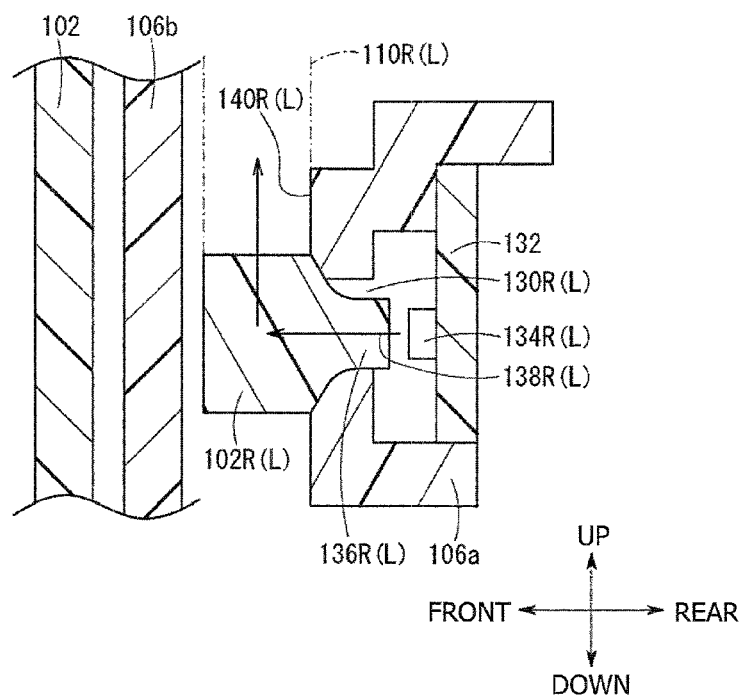
FIG. 8 is a sectional view taken along line VIII-VIII of FIGS. 3 and 4.

FIG. 7 is a front view showing the headlight device 10 in a state wherein the outer lens 102, the second extension 106b and the light guide members 110L and 110R have been detached. In addition, FIG. 8 is a sectional view of the surroundings of the bent portions 112L and 112R in the headlight device 10.

At those portions of the first extension 106a which correspond to the bent portions 112L and 112R and which are covered with the first extension 106b, a pair of light guide holes 130L and 130R is formed in left-right symmetry about the center line 104. In addition, a single sheet of substrate 132 facing the light guide holes 130L, 130R is disposed in an erected state, between the first extension 106a and the housing 100 (see FIGS. 8, 9, 11 and 12). At a front surface of the substrate 132, two light guide light sources 134L and 134R composed of LED light sources are disposed. In addition, parts of the bent portions 112L and 112R are configured as light guide parts 136L and 136R that pass through the light guide holes 130L and 130R and extend to the light guide light sources 134L and 134R.

Therefore, light beams 138L and 138R from the light guide light sources 134L and 134R are guided through the light guide parts 136L and 136R to the bent portions 112L and 112R. The thus guided light beams 138L and 138R undergo total reflection inside the light guide members 110L and 110R, before being radiated forward through the outer lens 102.

As above-mentioned, the pair of left and right light guide members 110L and 110R is attached to the extension cover 106 in a roughly X-shaped form. Therefore, the pair of left and right light guide members 110L and 110R can radiate a light beam 139 forward in a roughly X-shaped pattern, by causing total reflection of the light beams 138L and 138R inside thereof. Accordingly, when the headlight device 10 is viewed from the front side, the emission of light in a roughly X-shaped pattern can be observed.

Those portions of the first extension 106a that face the light guide members 110L and 110R are configured as reflective parts 140L and 140R by which the light beams radiated to the first extension 106a side by total reflection inside of the light guide members 110L, 110R are reflected toward the front side. More specifically, the reflective parts 140L and 140R are formed, for example, by vapor deposition of aluminum onto those surfaces of the first extension 106a that face the light guide members 110L and 110R.

Figure 12:
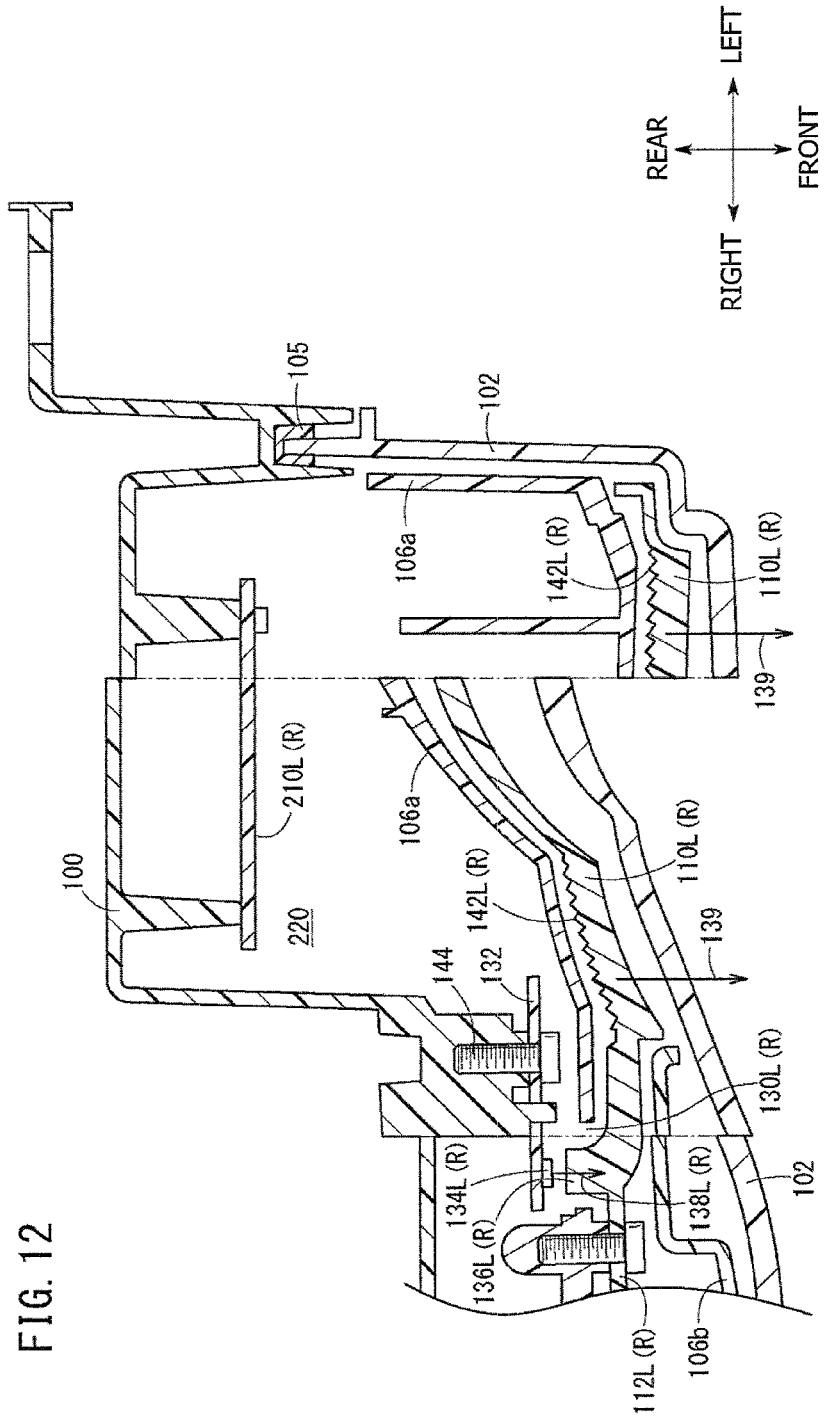
FIG. 12 is a sectional view taken along line XII-XII of FIGS. 3 and 4.

In addition, the light guide members 110L and 110R are provided with lens cuts 142L and 142R at least at parts of the back surfaces thereof (see FIG. 12). This ensures that the light beams 138L and 138R having undergone total reflection inside the light guide members 110L and 110R are efficiently radiated forward as the light beam 139 in a roughly X-shaped pattern.

In addition, those portions of the bent portions 112L and 112R that face the substrate 132 are covered with the second extension 106b on the front side. Therefore, the lens cuts 142L and 142R are formed at those portions of the light guide members 110L and 110R that are not covered with the second extension 106b. FIG. 12 shows an exemplary case wherein lens cuts 142L and 142R are formed at those portions of the light guide members 110L and 110R that are near both ends of the second extension 106b and at those portions of the light guide members 110L and 110R that are remote from the center line 104.

Figure 11:
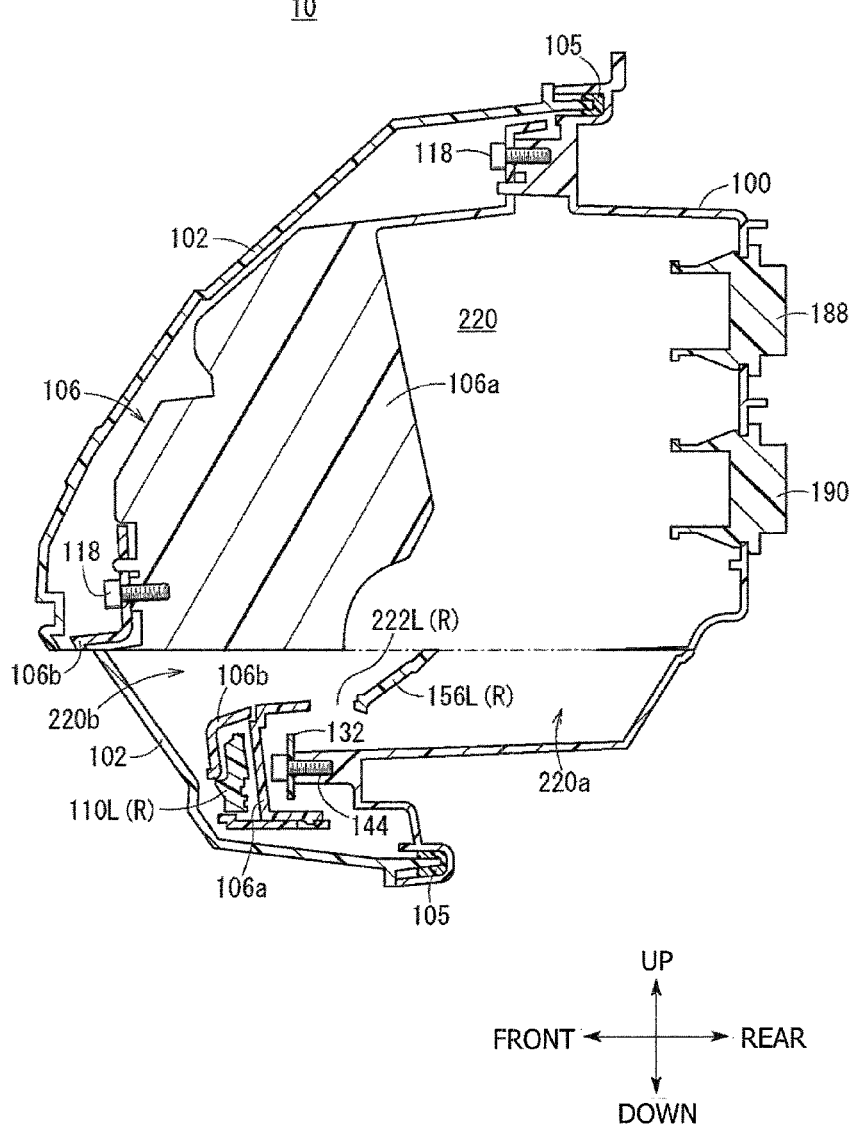
FIG. 11 is a sectional view taken along line XI-XI of FIGS. 3 and 4.

Further, the portion of the housing 100 that is near the center line 104 projects in the forward direction (see FIGS. 11 and 12). Therefore, the substrate 132 is fixed in an erected state, by putting a screw member 144 into screw engagement with a screw hole formed in the housing 100.

Furthermore, headlight light source parts 150L and 150R functioning as headlights of the headlight device 10 are contained in reflectors 152L and 152R disposed on the depth side of the first extension 106a.

More specifically, the headlight light source parts 150L and 150R are disposed in a plurality of reflectors 152L and 152R that are disposed respectively on the left and right sides, with the center line 104 as a center. In this case, two reflectors 152R are disposed side by side on the right side of the center line 104, whereas two reflectors 152L are disposed side by side on the left side of the center line 104.

As above-mentioned, the pair of left and right openings 108L and 108R is formed in the shape of eyes that are turned up at the corners. Therefore, the two reflectors 152R on the right side are disposed stepwise as one goes away from the center line 104. Similarly, the two reflectors 152L on the left side are disposed stepwise as one goes away from the center line 104. In other words, the reflectors 152L and 152R disposed in the stepped form on the left and right sides are arranged in the pattern of eyes that are turned up at the corners, correspondingly to the shape of the openings 108L and 108R.

The reflectors 152L and 152R are respectively composed of flat-surface-shaped upper surface parts 154L and 154R, and front extension parts 156L and 156R as a bottom portion extending in an arcuate sectional shape toward the front side from the rear side of the upper surface parts 154L and 154R (see FIGS. 4, 6, 7, 11, 13 and 14). In other words, each of the reflectors 152L and 152R is configured so as to open wide from the rear side toward the front side.

As above-mentioned, the reflectors 152L and 152R on the left and right sides are arranged stepwise in a direction away from the center line 104. Therefore, the height positions of the upper surface parts 154L and 154R and the height positions of the front extension parts 156L and 156R are also varied stepwise in a direction away from the center line 104. In addition, a partition plate 158R is provided between the two reflectors 152R on the right side. Similarly, a partition plate 158L is provided between the two reflectors 152L on the left side.

The headlight light source parts 150L and 150R are provided respectively at the upper surface parts 154L and 154R of the reflectors 152L and 152R. The headlight light source parts 150L and 150R are respectively composed of substrates 160L and 160R disposed substantially horizontally, and headlight light sources 162L and 162R (LED light source) disposed at a bottom surface of the substrates 160L and 160R so as to face the arcuate portions of the front extension parts 156L and 156R.

In this case, openings 164L and 164R are formed between the rear side of the upper surface parts 154L and 154R of the reflectors 152L and 152R and the rear side of the front extension parts 156L and 156R of the reflectors 152L and 152R. The headlight light source parts 150L and 150R are disposed at the openings 164L and 164R. In addition, heat sinks 166L and 166R (cooling means) fixedly supported by the housing 100 are disposed on upper surfaces of the substrates 160L and 160R. Couplers 168L and 168R are connected to rear-side portions of the substrates 160L and 160R. In addition, a controller (not shown) for controlling the headlight light sources 162L and 162R is provided outside the headlight device 10. The controller is connected through a harness and the couplers 168L and 168R to the substrates 160L and 160R on which the headlight light sources 162L and 162R are mounted.

When the headlight light sources 162L and 162R are driven, light beams 170L and 170R are emitted downwardly from the headlight light sources 162L and 162R toward the front extension parts 156L and 156R. The light beams 170L and 170R are reflected in a forward direction by the front extension parts 156L and 156R, to be radiated in a forward direction through the outer lens 102.

In addition, the reflectors 152L and 152R are partitioned by the partition plates 158L and 158R. Therefore, between the adjacent ones of the reflectors 152L and 152R, the light beam reflected by one of the reflectors can be inhibited from coming into the front side of the other of the reflectors.

In addition, the upper surface parts 154L and 154R are formed with arcuate parts 172L and 172R (rear parts) on the front side of the openings 164L and 164R (see FIGS. 4, 6, 7, 13 and 14). Therefore, in the front view, the arcuate parts 172L and 172R cover the headlight light source parts 150L and 150R. This ensures that when the headlight device 10 is viewed from the front side, the headlight light source parts 150L and 150R are invisible. Further, it suffices that each of the reflectors 152L and 152R is formed with at least one of the arcuate parts 172L and 172R. Thus, each of the reflectors 152L and 152R may be formed with a plurality of such arcuate parts.

Figure 9:
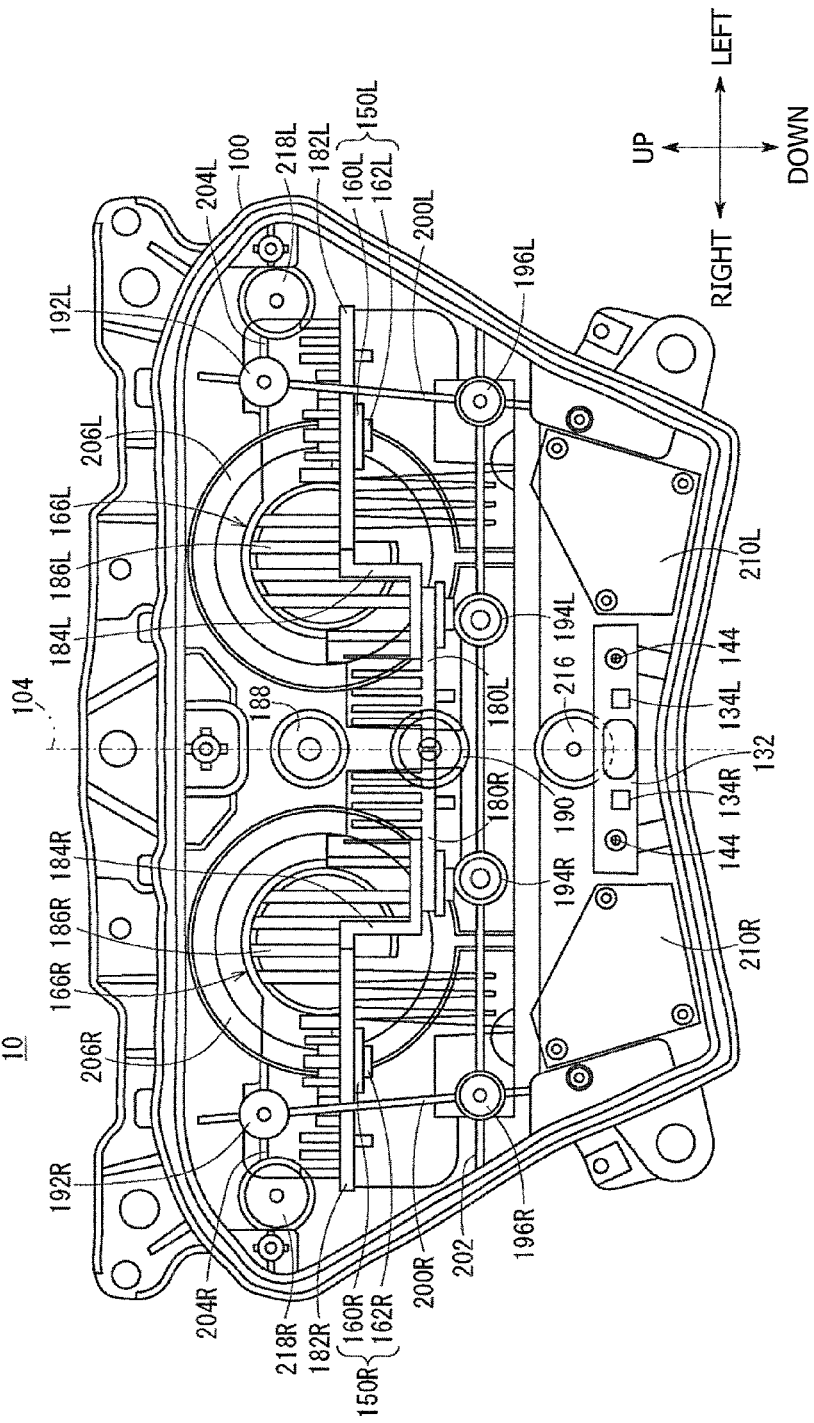
FIG. 9 is a front view showing a state wherein a first extension and reflectors have been detached, in the headlight device shown in FIG. 7.
Figure 10:
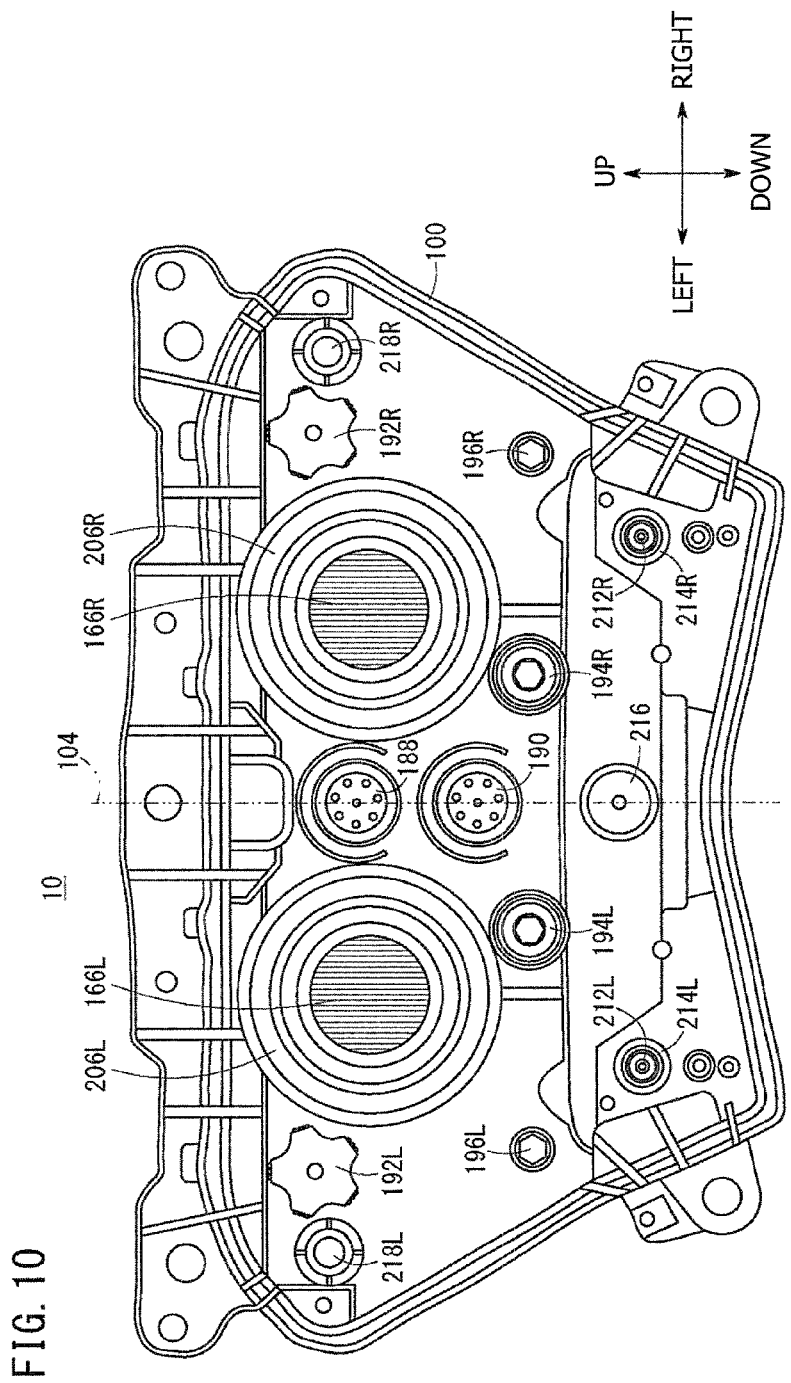
FIG. 10 is a back elevation of the headlight device of FIG. 3.

FIG. 9 shows a state wherein the extension cover 106 has been detached from the housing 100. FIG. 10 is a back elevation of the headlight device 10.

The housing 100 has the pair of heat sinks 166L and 166R fixedly supported in left-right symmetry about the center line 104. As above-mentioned, the upper surfaces 154L and 154R of the reflectors 152L and 152R are disposed stepwise as one goes away from the center line 104. Therefore, the headlight light source parts 150L and 150R are also disposed stepwise. Accordingly, the pair of left and right heat sinks 166L and 166R are also configured stepwise as one goes away from the center line 104, correspondingly to the heights at which the headlight light source parts 150L and 150R are arranged.

In other words, those portions of the heat sinks 166L and 166R that are located on the front surface side of the housing 100 are composed of first plate-shaped parts 180L and 180R connected to the headlight light source parts 150L and 150R near the center line 104, second plate-shaped parts 182L and 182R connected to the headlight light source parts 150L and 150R remote from the center line 104 and connection parts 184L and 184R which interconnect the first plate-shaped parts 180L and 180R and the second plate-shaped parts 182L and 182R.

Further, the first plate-shaped parts 180L and 180R, the second plate-shaped parts 182L and 182R and the connection parts 184L and 184R are formed with cooling fins 186L and 186R (see FIGS. 9, 13 and 14) that extend along the vertical direction and extend in the front-rear direction. In addition, the cooling fins 186L and 186R are formed to have arbitrary heights for avoiding interference with other members in the locations where they are formed.

At the portion of the housing 100 that is located between the two heat sinks 166L and 166R, two connectors 188 and 190 are disposed along the center line 104. The connector 188 is connected to the substrate 160R through the coupler 168R on the right side, while the connector 190 is connected to the substrate 160L through the coupler 168L on the left side.

In addition, the housing 100 is equipped with aiming bolts 192L to 194R for integral aiming adjustment of the headlight light source parts 150L and 150R in the vertical direction or in the left-right direction. Furthermore, the housing 100 is equipped also with bolts 196L and 196R serving as reference positions for the aiming adjustment.

In this case, the aiming bolts 194L and 194R and the bolts 196L and 196R are disposed at substantially the same height position. In addition, the aiming bolts 194L and 194R are connected to the reflectors 152L and 152R near the center line 104 (see FIG. 13).

The aiming bolt 192R and the bolt 196R are interconnected in the vertical direction by a rod 200R for aiming adjustment. The aiming bolt 192L and the bolt 196L are interconnected in the vertical direction by a rod 200L for aiming adjustment. The aiming bolts 194L and 194R and the bolts 196L and 196R are interconnected in the left-right direction by a rod 202 for aiming adjustment. Furthermore, the aiming bolt 192R and the heat sink 166R interconnected by a rod 204R extending in the left-right direction, whereas the aiming bolt 192L and the heat sink 166L are interconnected by a rod 204L extending in the left-right direction.

When the aiming bolts 192L and 192R are turned by the user (e.g., driver), the aiming bolts 192L and 192R are advanced or retracted in the front-rear direction. As a result, the rods 200L and 200R are swung in the front-rear direction, with the bolts 196L and 196R as a fulcrum. In addition, the rods 204L and 204R are swung in the front-rear direction.

As above-mentioned, the heat sinks 166L and 166R are connected to the rods 204L and 204R. Further, the headlight light source parts 150L and 150R are connected to the heat sinks 166L and 166R, and the headlight light source parts 150L and 150R are disposed at the reflectors 152L and 152R. Furthermore, the substrates 160L and 160R constituting the headlight light source parts 150L and 150R are connected to the couplers 168L and 168R.

Therefore, swings of the rods 204L and 204R in the front-rear direction are attended by an integral swing of the heat sinks 166L and 166R, the headlight light source parts 150L and 150R, the reflectors 152L and 152R, and the couplers 168L and 168R that are connected to the rods 204L and 204R. As a result, the height positions of the heat sinks 166L and 166R, the headlight light source parts 150L and 150R, the reflectors 152L and 152R, and the couplers 168L and 168R can be adjusted.

In other words, the aiming bolts 192L and 192R are aiming bolts for adjusting the heat sinks 166L and 166R, the headlight light source parts 150L and 150R, the reflectors 152L and 152R, and the couplers 168L and 168R in the vertical direction. In addition, since the heat sinks 166L and 166R are swung in the front-rear direction in response to the aiming adjustment, it is preferable for the heat sinks 166L and 166R to be supported on the housing 100 through bellows-like elastic members 206L and 206R.

On the other hand, when the aiming bolts 194L and 194R are turned by the user, the aiming bolts 194L and 194R are advanced or retracted in the front-rear direction. As above-mentioned, the aiming bolts 194L and 194R are connected to the reflectors 152L and 152R. In addition, the headlight light source parts 150L and 150R are disposed at the reflectors 152L and 152R. Further, the headlight light source parts 150L and 150R are connected to the heat sinks 166L and 166R and the couplers 168L and 168R.

Therefore, advancing or retracting the aiming bolts 194L and 194R in the front-rear direction is attended by an integral advance or retraction of the headlight light sources 150L and 150R, the reflectors 152L and 152R, the heat sinks 166L and 166R, and the couplers 168L and 168R. As a result, the left-right-directional positions of the headlight light sources 150L and 150R, the reflectors 152L and 152R, the heat sinks 166L and 166R, and the couplers 168L and 168R can be adjusted.

As above-mentioned, the substrate 132 is fixed to a lower-side portion of the housing 100, in an erect state by the screw member 144. In addition, a pair of other substrates 210L and 210R as driving units for the light guide light sources 134L and 134R are disposed on the left and right sides of the substrate 132. In this case, the substrate 132 is connected with the substrates 210L and 210R through electric wires (not shown). In addition, electric power lines extending from the substrates 210L and 210R are led out from the headlight device 10 through grommets 214L and 214R provided on the housing 100.

Furthermore, the housing 100 is provided with breathing holes 216, 218L and 218R formed of an air-permeable waterproof material (for example, Gore-Tex (a registered trademark)) which is permeable to air but impermeable to water, dust or the like. In this case, the breathing hole 216 provided on the lower side of the connectors 188 and 190 along the center line 104 is a breathing hole provided mainly for introduction of outside air (air). On the other hand, the breathing holes 218L and 218R are breathing holes provided mainly for discharging to the outside the air having been introduced through the breathing hole 216 into the inside space of the headlight device 10 and having cooled the parts inside the headlight device 10.

In addition to the above-mentioned breathing holes 216, 218L and 218R, the headlight device 10 according to this embodiment is provided with the following component elements, for efficiently cooling the component elements disposed in an inside space 220 (see FIGS. 11 to 14).

Figure 13:
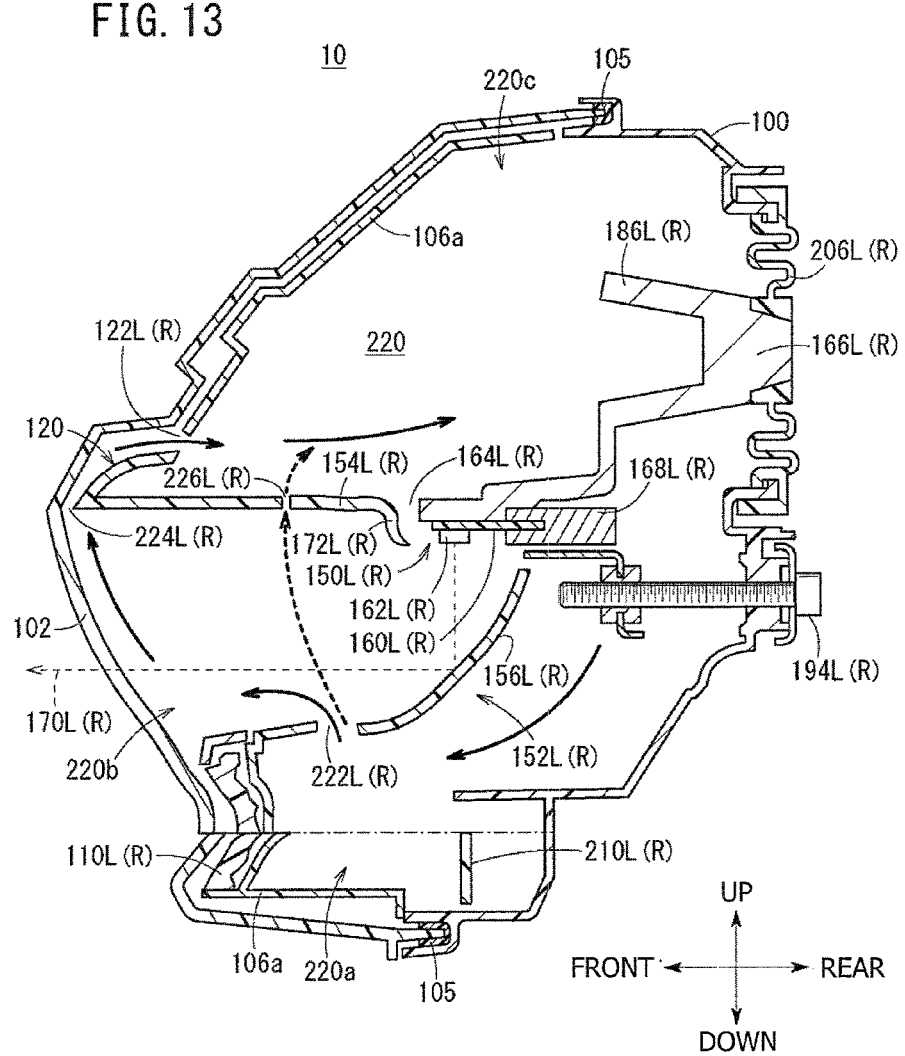
FIG. 13 is a sectional view taken along line XIII-XIII of FIGS. 3 and 4.
Figure 14:
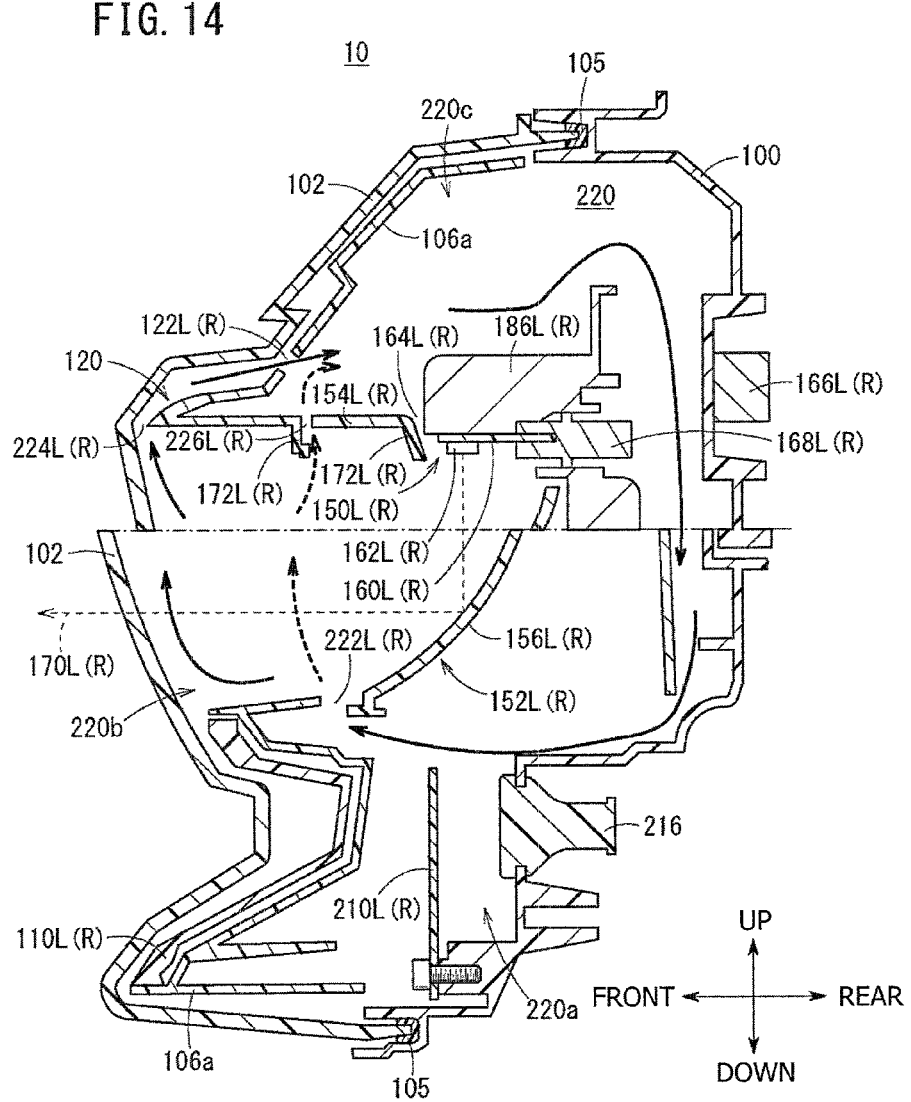
FIG. 14 is a sectional view taken along line XIV-XIV of FIGS. 3 and 4.

As shown in FIGS. 13 and 14, the inside space 220 is generally partitioned by the reflectors 152L and 152R into three spaces. More specifically, the inside space 220 is composed of an inside space 220a that faces the breathing hole 216 and is located rearwardly of the front extension parts 156L and 156R of the reflectors 152L and 152R, an inside space 220b forwardly of the reflectors 152L and 152R and an inside space 220c on the upper side of the reflectors 152L and 152R.

In addition, inlet parts 222L and 222R as openings through which the air (airflow generated by traveling of the vehicle) introduced from the outside into the inside space 220a through the breathing hole 216 is taken into the inside space 220b are provided on the lower side of the front extension parts 156L and 156R. In addition, to the first extension 106a on the upper side of the inside space 220b, a louver 120 is mounted so as to be close to the outer lens 102. The louver 120 is provided with openings 122L and 122R as outlet parts for discharging the air having flowed through the inside space 220b into the inside space 220c.

In FIGS. 13 and 14, the flows of the air taken in through the breathing hole 216 into the inside space 220 are indicated by arrowed solid lines and broken lines.

The upper surface parts 154L and 154R of the reflectors 152L and 152R are provided with gaps 224L and 224R (first gaps) between the outer lens 102 and themselves. Further, the upper surface parts 154L and 154R are provided, between the opening 164 and the gaps 224L and 224R, with gaps 226L and 226R (second gaps) which are narrower than the gaps 224L and 224R.

In this case, the air (cooling air) taken in through the inlet parts 222L and 222R into the inside space 220b is divided in the inside space 220b into the air flowing toward the gaps 224L and 224R as indicated by solid-line arrows, and the air flowing toward the gaps 226L and 226R as indicated by broken-line arrows.

This ensures that the air flowing within the inside space 220b cools the substrates 132, 210L and 210R. Further, this air absorbs the heat released into the inside space 220b by driving of the light guide light sources 134L and 134R and the heat released into the inside space 220b by driving of the headlight light sources 162L and 162R.

As above-mentioned, the openings 122L and 122R as outlet parts are provided on the upper side of the inside space 220b so as to be close to the outer lens 102. Therefore, in the inside space 220b, the air flowing as indicated by the solid-line arrows absorbs the heat from the component parts, and flows upward along the inner surface of the outer lens 102.

An outer surface of the outer lens 102 of the headlight device 10 receives, for example, airflow generated as the motorcycle 12 travels. Therefore, when the air having absorbed heat flows upward along the inner surface of the outer lens 102 as indicated by the solid-line arrows, the air is cooled by the airflow (generated by movement of the vehicle) received by the outer lens 102, and the heat is released to the exterior through the outer lens 102. The cooled air passes through the gaps 224L and 224R between the outer lens 102 and the upper surface parts 154L and 154R of the reflectors 152L and 152R, and is discharged through the openings 122L and 122R into the inside space 220c.

Thus, when air flows in the direction as indicated by the solid-line arrows, a cooling effect owing to the airflow can be expected. Thus, enhancement of the cooling efficiency concerning the headlight device 10 as a whole can be expected.

In addition, with the gaps 226L and 226R set to be narrower than the gaps 224L and 224R, most part of the air flowing within the inside space 220b will more easily collect in the gaps 224L and 224R. As a result, further enhancement of the cooling effect concerning the headlight device 10 as a whole can be expected.

Further, in the inside space 220b, the air indicated by the broken-line arrows absorbs heat from the component elements, and is discharged through the gaps 226L and 226R into the inside space 220c.

In the inside space 220c, the heat sinks 166L and 166R absorb the heat generated in the headlight light sources 162L and 162R, the substrates 160L and 160R, and the couplers 168L and 168R, and releases the heat into the inside space 220c. In this case, since the air after being cooled is introduced into the inside space 220c, the heat sinks 166L and 166R can be cooled efficiently. Moreover, since the cooling fins 186L and 186R extend in the front-rear direction and in the vertical direction so as to extend along the flowing direction of air, the heat sinks 166L and 166R can be cooled more efficiently.

Furthermore, the provision of the housing 100 with the plurality of breathing holes 216, 218L and 218R ensures that a large introduction area for the outside air can be secured, so that a larger quantity of the outside air can be taken into the inside space 220 and put into convection. As a result, the cooling performance concerning the headlight device 10 can be enhanced. In addition, the appearance quality can also be enhanced.

Further, the air having passed through the surroundings of the heat sinks 166L and 166R is introduced into the inside space 220a. Thereafter, this air is again taken into the inside space 220b through the inlet parts 222L and 222R, or is discharged to the outside through the breathing holes 218L and 218R.

As has been described above, according to the headlight device 10 for the motorcycle 12 in the present embodiment, those portions of the light beam 139 emitted in a predetermined sectional pattern through the light guide members 110L and 110R on the basis of the light beams 138L and 138R coming from the light guide light sources 134L and 134R that are radiated to the rear side of the light guide members 110L and 110R are reflected by the reflective parts 140L and 140R toward the front side. This ensures that even those portions (for example, upper-side portions) of the light guide members 110L and 110R that are remote from the light guide light sources 134L and 134R can obtain the light beams 138L and 138R from the light guide light sources 134L and 134R in sufficient quantities. Thus, a desired light emission amount can be secured. As a result, emission of a light beam in a desired cross-sectional pattern and in a sufficient light emission amount can be secured, on the basis of the light guide members 110L and 110R as a whole.

In addition, the headlight device 10 is provided with the extension cover 106, for a design-basis purpose of enhancing visibility. In view of this, those portions of the first extension 106a that correspond to the light guide members 110L and 110R (those portions of the first extension 106a at which the light guide members 110L and 110R are mounted) are provided with a reflecting function, to form the reflective parts 140L and 140R. This makes it possible to secure a desired light emission mode without increasing the number of component parts of the headlight device 10.

In addition, the light guide light sources 134L and 134R are disposed correspondingly to the bent portions 112L and 112R of the light guide members 110L and 110R, and the bent portions 112L and 112R and the light guide light sources 134L and 134R are covered with the second extension 106b, whereby the light guide light sources 134L and 134R can be made externally invisible. As a result, the light guide light sources 134L and 134R can be disposed inconspicuously. Thus, a favorable external appearance shape can be secured.

Further, the light guide light sources 134L and 134R are mounted on a single sheet of substrate 132 at positions on both left and right sides, and the light guide light sources 134L and 134R are made to emit light, whereby the light beam 139 with a desired light emission form can be realized inexpensively. Since the light guide light sources 134L and 134R are disposed in left-right symmetry at positions on both left and right sides on the single sheet of substrate 132, in the vicinity of the center line 104, the interval between the two light guide light sources 134L and 134R is shortened. Consequently, the headlight device 10 inclusive of the light guide light sources 134L and 134R can be reduced in overall size.

In addition, the light guide members 110L and 110R are provided with the lens cuts 142L and 142R at rear portions thereof, whereby the light beams 138L and 138R having undergone total reflection inside the light guide members 110L and 110R can be efficiently radiated forward as the light beam 139 having a desired cross-sectional shape.

Furthermore, with the light guide parts 136L and 136R provided so as to be close to the light guide light sources 134L and 134R, the light beams 138L and 138R from the light guide light sources 134L and 134R can be guided to the light guide members 110L and 110R without being wasted.

In addition, according to the headlight device 10 for the motorcycle 12 in this embodiment, the openings 122L and 122R of the louver 120 are provided on the upper side of the inlet parts 222L and 222R of the reflectors 152L and 152R, close to the outer lens 102 located on the front side. This ensures that the air taken into the inside space 220b via the inlet parts 222L and 222R moves upwardly along the inner surface of the outer lens 102, and flows to the openings 122L and 122R. As a result, the air flowing within the inside space 220b can be cooled by the airflow making contact with the outer surface of the outer lens 102. Accordingly, cooling efficiency concerning the headlight device 10 can be enhanced inexpensively, without using any special device.

Since a plurality of the openings 122L and 122R of the louver 120 are provided along the left-right direction, sufficiently large opening areas of the openings 122L and 122R can be secured. As a result, the flow of air (cooling air) can be made efficient. Thus, cooling efficiency concerning the headlight device 10 can be further enhanced.

In addition, when the reflectors 152L and 152R and the openings 122L and 122R are externally viewed through the outer lens 102, the openings 122L and 122R are visually recognized as being visible on a large scale on the upper side of the reflectors 152L and 152R. As a result, the external appearance quality of the headlight device 10 can also be enhanced.

In short, the arrangement of the louver 120 ensures that the passage area for the air passing through the openings 122L and 122R can be broadened, while securing a coherent external appearance. Therefore, the cooling efficiency can also be enhanced.

Further, the arrangement of the headlight light source parts 150L and 150R (which are heat-generating members), the heat sinks 166L and 166R, and the couplers 168L and 168R on the rear side of the reflectors 152L and 152R ensures that these members are hardly visible externally. In addition, the arrangement of the heat sinks 166L and 166R on the rear side of the reflectors 152L and 152R ensures that the heat sinks 166L and 166R can be cooled by the cooled air which is discharged through the openings 122L and 122R and introduced into the inside space 220c. As a result, the cooling efficiency can be further enhanced.

Furthermore, the arrangement of the cooling fins 186L and 186R along the direction in which air flows ensures that the cooling efficiency can be further enhanced.

In addition, the gaps 226L and 226R provided in the upper surface parts 154L and 154R of the reflectors 152L and 152R are narrower than the gaps 224L and 224R provided close to the outer lens 102. Therefore, the air taken in through the inlet parts 222L and 222R into the inside space 220b is liable to flow to and through the gaps 224L and 224R, as indicated by solid-line arrows in FIGS. 13 and 14. Consequently, the cooling effect owing to the airflow can be expected to be high and a further cooling effect concerning the headlight device 10 as a whole can be expected.

Further, according to the headlight device 10 for the motorcycle 12 in this embodiment, the substrates 160L and 160R with the headlight light sources 162L and 162R mounted thereon are disposed respectively at the upper surface parts 154L and 154R of the reflectors 152L and 152R formed stepwise along the left-right direction. This enables the headlight light source parts 150L and 150R inclusive of the substrates 160L and 160R to be arranged efficiently, while securing required functions such as external appearance quality of the shape of eyes that are turned up at the corners, light distribution characteristics, etc. As a result, it is possible to make the most of the spaces around the reflectors 152L and 152R, which have been dead spaces, and to realize a reduction in the size of the headlight device 10.

More specifically, in the case where the reflectors 152L and 152R are disposed in the shape of eyes that are turned up at the corners, the spaces defined by the reflectors 152L and 152R (the spaces through which the light beams 170L and 170R pass) are roughly triangular, in the front view, as shown in FIGS. 4, 6 and 7. If the headlight light source parts 150L and 150R are to be disposed in such triangular spaces, they are disposed obliquely so as to conform to the spaces. However, an arrangement of the headlight light source parts 150L and 150R obliquely is difficult to realize, and lowers the light distribution characteristics.

In view of this, according to the present embodiment, the upper surface parts 154L and 154R of the reflectors 152L and 152R are formed to be substantially horizontal, and the headlight light source parts 150L and 150R are disposed at the horizontal upper surface parts 154L and 154R. This makes it possible to enhance both layout properties and light distribution characteristics.

In addition, the headlight light sources 162L and 162R are disposed on the bottom surfaces of the substrates 160L and 160R arranged at the upper surface parts 154L and 154R, and the headlight light sources 162L and 162R face the curved front extension parts 156L and 156R of the reflectors 152L and 152R. This ensures that while hiding the positions of the headlight light sources 162L and 162R from the external view, the headlight light sources 162L and 162R are driven to emit light, and the light beams 170L and 170R emitted from the headlight light sources 162L and 162R are reflected by the front extension parts 156L and 156R, whereby the light beams can be radiated in a forward direction through the outer lens 102. As a result, the external appearance quality can be further enhanced.

In this case, since the headlight light source parts 150L and 150R are covered with the arcuate parts 172L and 172R on the front side, the headlight light source parts 150L and 150R can be securely prevented from being visible in the front view. Consequently, a further enhancement of the external appearance quality can be expected.

While the spaces on the upper side of the reflectors 152L and 152R inside the headlight device 10 formed in the shape of eyes that are turned up at the corners have been dead spaces, these dead spaces can be effectively utilized by disposing the heat sinks 166L and 166R therein. This ensures that cooling efficiency can also be enhanced.

While the present invention has been described above by showing an embodiment thereof, the technical scope of the invention is not restricted to the scope of description of the embodiment above. It is obvious to those skilled in the art that a diversity of modifications or improvements can be added to the above embodiment. Such modifications as would be obvious to one skilled in the art are intended to be included within the scope of the following claims

What is claimed is:

1. A headlight device for a motorcycle, comprising:
   a light source;
   a reflector adapted to reflect a light beam from the light source and transmit the reflected light beam, the reflector having an upper surface provided with a first gap at a position close to a lens on a front side and a second gap rearwardly of the first gap, the lens radiating a light beam forward;
   an inlet part through which cooling air is taken in, the inlet part provided at the reflector;
   an outlet part through which the cooling air is discharged, the outlet part provided at a position on an upper side of the inlet part of the reflector and close to the lens;
   an extension cover extending from the upper surface of the reflector, the extension cover forming a channel extending from the first gap; and
   an opening in the extension cover, wherein an air stream flowing through the first gap flows through the opening.

2. The headlight device for the motorcycle according to claim 1, wherein a plurality of the outlet parts are provided along a lateral direction of the motorcycle.

3. The headlight device for the motorcycle according to claim 1, further comprising
   a heat sink disposed rearwardly of the reflector.

4. The headlight device for the motorcycle according to claim 1,
   wherein the light source is an LED light source; and
   the headlight device further comprises cooling means for cooling the LED light source, the cooling means being disposed rearwardly of the reflector, the cooling air cooled by the cooling means.

5. The headlight device for the motorcycle according to claim 1, the second gap is narrower than the first gap.

6. The headlight device for the motorcycle according to claim 5, wherein the reflector includes arcuate parts projecting downwardly for covering the light source when viewed from the front.

7. The headlight device for the motorcycle according to claim 1, further including at least one breathing hole being covered with an air-permeable waterproof material for introducing ambient air into the headlight device.

8. The headlight device for the motorcycle according to claim 7, and further including at least one breathing hole being covered with an air-permeable waterproof material for discharging air out of the headlight device.

9. A headlight device for a motorcycle comprising:
a light source for generating a beam of light;
a lens to radiate a light beam;
a reflector for reflecting the beam of light in a forward direction and for transmitting the reflected beam of light through the lens to radiate the light beam in the forward direction, the reflector having an upper surface provided with a first gap at a position close to the lens on a front side and a second gap rearwardly of the first gap;
an inlet part through which cooling air is taken in, said inlet part being provided at a lower portion of the reflector; and
an outlet part through which the cooling air is discharged, the outlet part being provided at a position on an upper side of the inlet part of the reflector and in close proximity to the lens,
an extension cover extending from the upper surface of the reflector, the extension cover forming a channel extending from the first gap; and
an opening in the extension cover, wherein an air stream flowing through the first gap flows through the opening.

10. The headlight device for the motorcycle according to claim 9, wherein a plurality of the outlet parts are provided along a lateral direction of the motorcycle.

11. The headlight device for the motorcycle according to claim 9, wherein the light source is an LED light source; and
the headlight device further comprises a heat sink for cooling the LED light source, the heat sink being disposed rearwardly of the reflector.

12. The headlight device for the motorcycle according to claim 9, wherein the light source is an LED light source; and
the headlight device further comprises cooling means for cooling the LED light source, the cooling means being disposed rearwardly of the reflector, the cooling air cooled by the cooling means.

13. The headlight device for the motorcycle according to claim 9,
wherein the second gap is narrower than the first gap.

14. The headlight device for the motorcycle according to claim 13, wherein the reflector includes arcuate parts projecting downwardly for covering the light source when viewed from the front.

15. The headlight device for the motorcycle according to claim 9, further including at least one breathing aperture being covered with an air-permeable waterproof material for introducing ambient air into the headlight device.

16. The headlight device for the motorcycle according to claim 15, and further including at least one breathing aperture being covered with an air-permeable waterproof material for discharging air out of the headlight device.

* * * * *